(12) United States Patent
Prossegger

(10) Patent No.: US 9,296,186 B2
(45) Date of Patent: Mar. 29, 2016

(54) DEVICE FOR PRODUCING A SKIRTING STRIP PREFINISHED AT THE FACTORY

(71) Applicant: Walfred Prossegger, Pörtschach (AT)

(72) Inventor: Walfred Prossegger, Pörtschach (AT)

( * ) Notice: Subject to any disclaimer, the term of this patent is extended or adjusted under 35 U.S.C. 154(b) by 199 days.

(21) Appl. No.: 14/195,597

(22) Filed: Mar. 3, 2014

(65) Prior Publication Data

US 2015/0096686 A1    Apr. 9, 2015

(30) Foreign Application Priority Data

Oct. 7, 2013  (AT) .............................. GM50137/2013

(51) Int. Cl.
| | |
|---|---|
| B32B 37/04 | (2006.01) |
| B29C 47/00 | (2006.01) |
| B29C 47/02 | (2006.01) |
| B29C 53/04 | (2006.01) |
| B32B 41/00 | (2006.01) |
| E04F 19/04 | (2006.01) |

(52) U.S. Cl.
CPC ............. *B32B 37/04* (2013.01); *B29C 47/0059* (2013.01); *B29C 47/026* (2013.01); *B29C 53/043* (2013.01); *B32B 41/00* (2013.01); *B32B 2307/7265* (2013.01); *B32B 2327/06* (2013.01); *B32B 2398/00* (2013.01); *B32B 2419/00* (2013.01); *E04F 19/0486* (2013.01)

(58) Field of Classification Search
CPC   B29C 47/0059; B29C 47/026; B29C 53/043; E04F 19/0486; B32B 37/04; B32B 41/00; B32B 2307/7265; B32B 2327/06; B32B 2398/00; B32B 2419/00

USPC .......... 156/359, 443, 366; 118/29, 30, 24, 27; 425/505, 515, 506, 96, 98; 264/285, 264/266

See application file for complete search history.

(56) References Cited

U.S. PATENT DOCUMENTS

| | | | | |
|---|---|---|---|---|
| 3,081,213 A | * | 3/1963 | Chinn .................. | B29C 47/026 118/401 |
| 3,202,066 A | * | 8/1965 | Palmer ................. | B29C 53/043 156/493 |

FOREIGN PATENT DOCUMENTS

| | | |
|---|---|---|
| DE | 203 14 477 U1 | 4/2004 |
| EP | 1 514 979 B1 | 5/2004 |
| GB | 721086 * | 2/1953 |

OTHER PUBLICATIONS

Espacenet English Language Abstract of EP1514979 (B1).
Espacenet English Language Abstract of DE20314477 (U1).

* cited by examiner

*Primary Examiner* — Jacob T Minskey
*Assistant Examiner* — Vishal I Patel
(74) *Attorney, Agent, or Firm* — Tiajoloff and Kelly LLP

(57) ABSTRACT

The present invention relates to a device for producing a skirting strip prefinished at the factory of the nature of a skirting for floor coverings made of plastic, PVC, rubber, linoleum, or related materials for producing a moisture-tight wall transition. The device consists of a melting and application unit (10) and an edge support wedge molding profile (21), which is functionally connected via a transport device (4) for the strip-shaped blank (6) to the shaping unit (1), and which molds, calibrates, and simultaneously attaches to the convex curvature of the strip-shaped blank (6), the edge support wedge made of molten plastic or hot-melt adhesive.

17 Claims, 3 Drawing Sheets

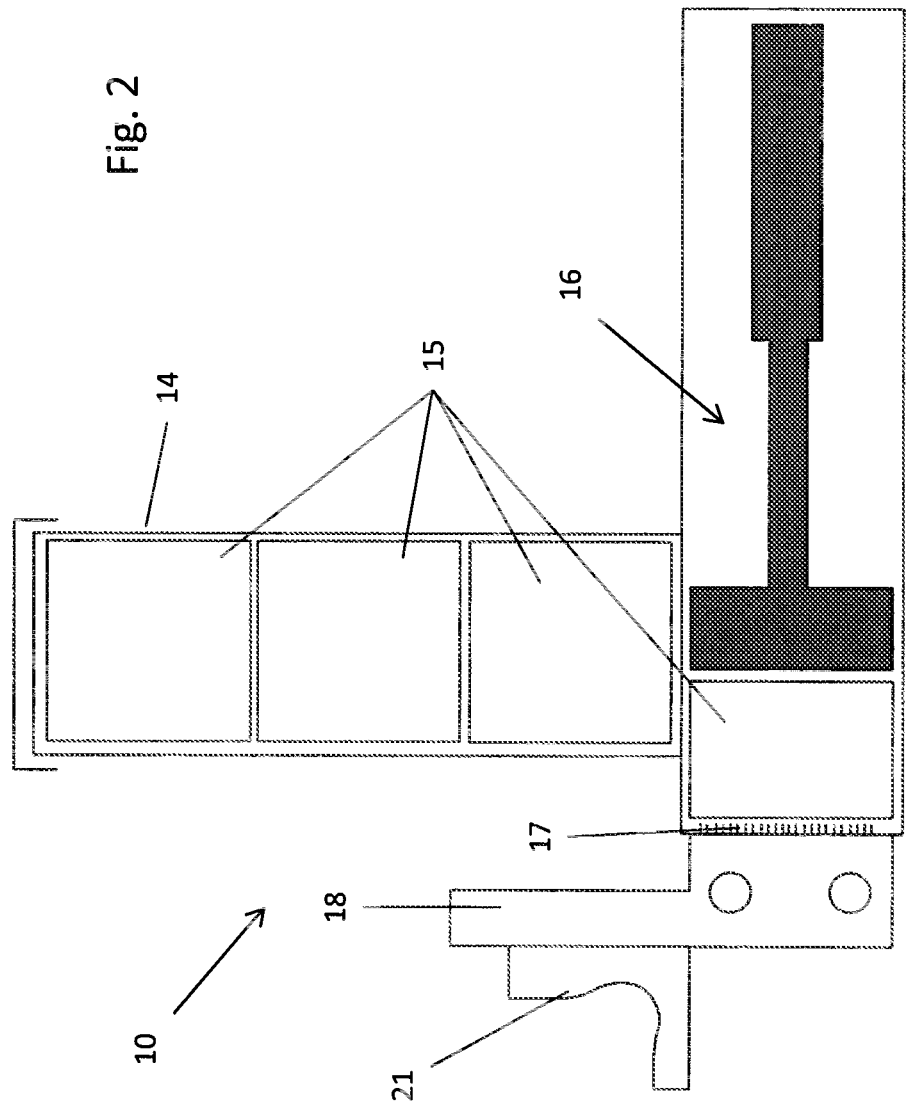

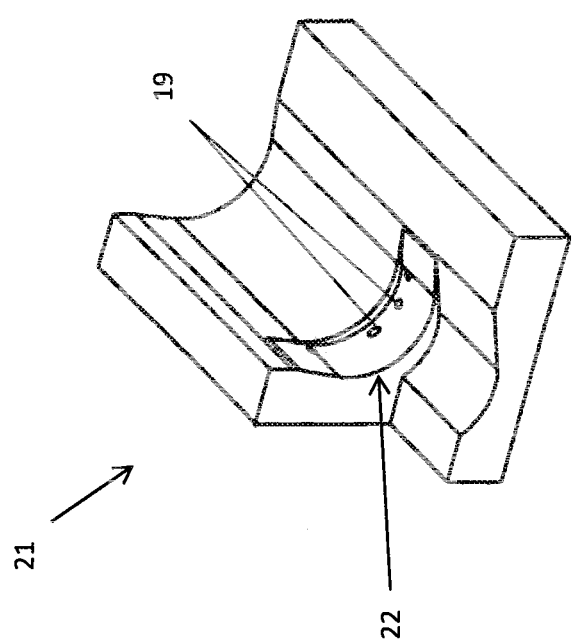

DEVICE FOR PRODUCING A SKIRTING STRIP PREFINISHED AT THE FACTORY

The present invention relates to a device for producing a skirting strip prefinished at the factory in the nature of a skirting for floor coverings made of plastic, PVC, rubber, linoleum, or related materials for producing a moisture-tight wall transition.

These coverings are laid on floating floor screeds or on composite floor screeds. Between the floor screed covering and the adjoining masonry, it is necessary to provide an absolutely moisture-tight connection of the surface covering, which does not lose its absolute leak-tightness due to thermal expansion, nor due to shrinkage in the event of cold, nor due to mechanical loads, for example, by floor cleaning machines.

Wipeable floor coverings having skirting strips are primarily used in public buildings and must be implemented as absolutely moisture-tight for hygienic reasons. The care of the floors, which is also required daily for hygienic reasons, is fundamentally performed here using cleaning machines, which can damage the molding of the skirting strip in the event of improper handling. Due to the reinforcement of the skirting strips in the bending region by means of underlay wedges, this region becomes more impact-resistant and pressure-resistant and therefore less easily mechanically damaged.

The connection between the floor covering, which covers the floor screed, and the masonry is produced by a covering strip, which is glued on the floor screed and welded to the covering of the floor screed on one side and is glued to the masonry on the other side, wherein this masonry is overlapped by this covering strip over a predetermined height.

Because especially the transition region from floor screed to masonry, which has an expansion joint made of polystyrene in the case of floating floor screeds, for example, represents a weak point in particular for mechanical damage, the covering strip is supported on its rear side in this region by a continuous wedge-shaped support body. Impact loads in this region can thus be attenuated and tearing can be prevented.

This skirting strip is typically produced such that firstly the wedge-shaped support body is attached in the cleaned transition region from floor screed to masonry. This support body, which usually consists of PVC, is brought to the construction site in rolls of several meters and must first be brought into linear form before it is installed. This is typically performed by light heating, for example, using a handheld hot air blower.

As soon as the support body is cut to the required length and linearly aligned, the surfaces touching the floor screed and the wall are coated with adhesive compound and pressed on the appropriate points. Subsequently, the covering material is cut into strips at the construction site, coated with adhesive compound, heated by means of handheld hot air blower or gas cartridge, and glued onto the floor screed, the support body, and the wall, to finally be butt-welded with the flat covering on the floor screed.

A refinement of this method is described in EP 1 514 979 B1. A production method for a skirting strip for floor coverings made of PVC, rubber, linoleum, or related materials is described therein, which can be installed in only two work steps at the construction site.

The floor covering is cut to size into strips at the factory, then at a right angle along its longitudinal axis, and coated in the outer edge region with an edge support material, preferably made of permanently-elastic plastic. The skirting strip prepared at the factory in this manner is only glued onto the floor screed and the wall at the construction site and then welded to the flat floor covering. Separate attachment of a support body is entirely omitted. Furthermore, manually cutting the strips to size at the construction site is also omitted, since the strips can be cut to size at the factory more rapidly and with higher precision by machine.

In this manner, the point between the floor screed and the masonry is optimally bridged by the skirting strip having the edge support wedge, so that no damage can arise on the covering for example, due to cleaning machines.

The skirting strips prepared in this manner at the factory are fastened in the stretched state on a support body, which can also be part of the packaging, conveyed to the installation location, and can be fastened there directly without further processing. Cutting to length using a miter cut is only necessary in the region of wall edges, as also in the conventional method.

The service life of the wall transition can be lengthened multiple times using this skirting strip, as a result of its higher quality for example, no waves or tensions can form due to incorrect gluing. A further advantage is that approximately 50% of the work time on the construction site is omitted, whereby the installation price can be substantially decreased. Positive effects on the health of the floor installers are also to be expected due to the lesser physical exertion.

However, a device suitable for production at the factory of the skirting strip is only peripherally mentioned in this EP 1 514 979 B1, wherein no design details are mentioned.

The present invention therefore has the object of specifying a device which is suitable for producing such a skirting strip, in particular a skirting strip according to EP 1 514 979 B1. The workpiece, a strip-shaped blank made of a floor covering material made of PVC, rubber, linoleum, or related materials, is bent in one work step along its longitudinal axis in a defined manner and has an edge support wedge made of permanently-elastic plastic or made of hot-melt adhesive applied in a defined shape and thickness along the convex curvature surface.

This object is achieved by a device having the features of Claim 1. Advantageous refinements are the subject matter of the dependent claims.

The advantage therefore results that the skirting strip can be prefinished at the factory substantially more rapidly and can be produced with greater precision than could be performed on the construction site.

The device according to the invention consists of the combination of a shaping unit for the strip-shaped blank and a melting and application unit for a plastic or hot-melt adhesive, which is permanently-elastic and dimensionally-stable at room temperature, and which is molded and calibrated by means of an edge support wedge molding profile according to the invention. A transport unit forms the functional connection between the shaping unit and the edge support wedge molding profile, wherein the control of the transport speed is controlled as a function of the type of the floor covering material, the type of the dimensionally-stable plastic or hot-melt adhesive, and the application temperature thereof. The strip-shaped blank already leaves the device according to the invention in its final form or is temporarily stored for further cooling in a cooling mold before it is packaged ready for shipping.

The device according to the invention will be explained in greater detail hereafter on the basis of the figures, wherein the figures only relate to a preferred embodiment variant. It is therefore apparent that the invention is not restricted exactly to the variant shown in the figures, but rather also includes variations which have the features of the main claim.

In the figures:

FIG. 2 shows a schematic section through the application device for liquid plastic or hot-melt adhesive, FIG. 3 shows a diagonal view of the edge support wedge molding profile according to the invention.

Figure 1:
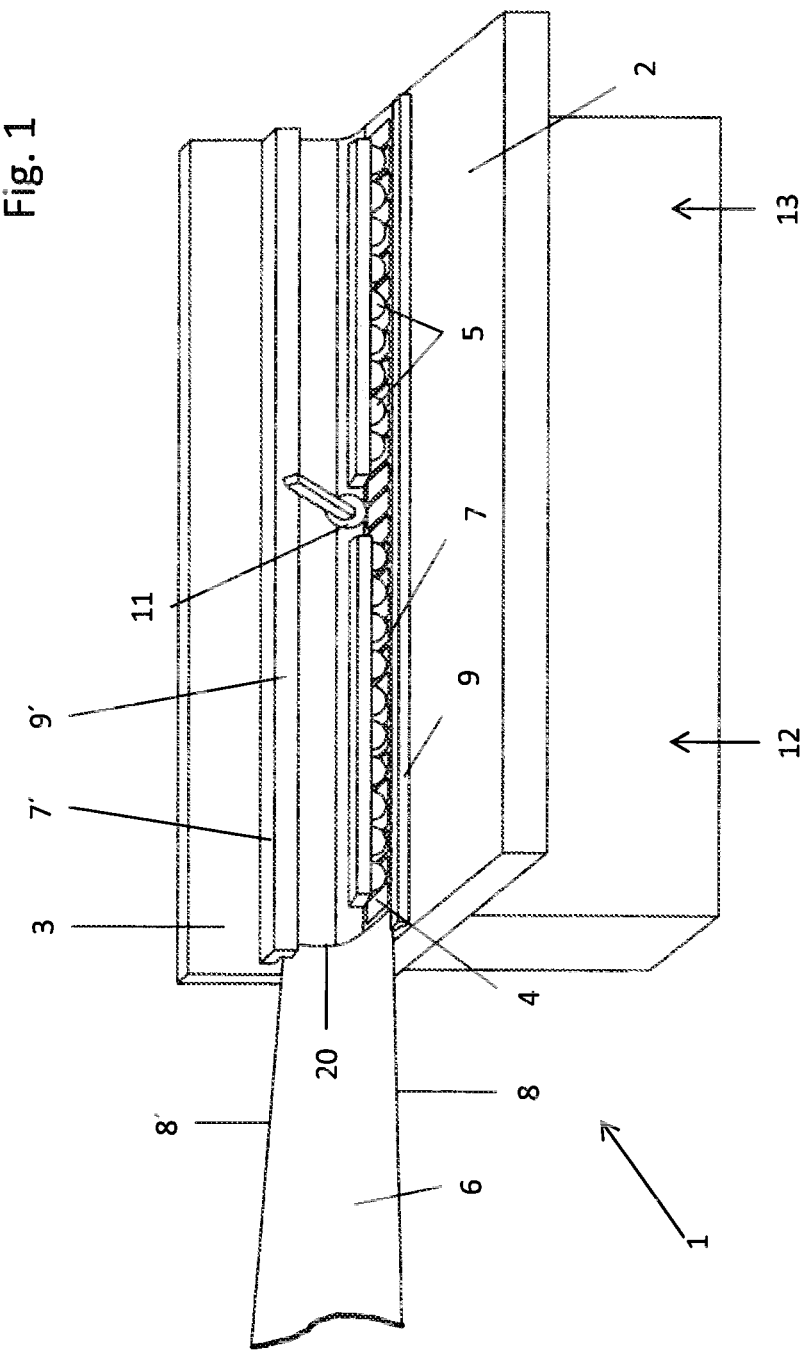
FIG. 1 shows a diagonal view of the device from the front.

According to FIG. 1, the shaping unit 1 consists of a horizontal transport table 2, which adjoins a perpendicular component 3. An endlessly revolving transport chain 4 runs in the transport table 2, which transports the strip-shaped blank 6 through the shaping unit 1 in cooperation with contact pressure rollers 5 arranged over the transport chain 4. The strip-shaped blank 6 presses with its longitudinal edges 8, 8' on two guide profiles 7, 7' aligned at a right angle to one another. The first guide profile 7 is arranged adjacent to the transport chain 4. The second guide profile 7' is provided on the perpendicular component 3. The L-shaped guide profiles 7, 7' are settable by means of final control elements (not shown) exactly at the desired leg heights of the skirting strip to be produced and the desired radius of curvature and the exposed profile legs 9, 9' thereof encompass the longitudinal edges 8, 8' of the strip-shaped blank 6.

The strip-shaped blank 6 is inserted using its front edge 20 laterally into the guide profiles 7, 7', wherein the strip-shaped blank 6 already experiences a curvature until the front edge 20 of the strip-shaped blank 6 is engaged between the transport chain 4 and the contact pressure rollers 5 and is transported further by the transport chain 4 through the shaping unit 1.

The transport chain 4 thereafter moves the strip-shaped blank 6 past an edge support wedge molding profile 21, which lies behind the strip-shaped blank 6, wherein—as shown in FIG. 2—the edge support wedge molding profile 21 is part of an application unit 10 for molten plastic or hot-melt adhesive, and wherein the strip-shaped blank 6 receives its final radius of curvature due to a further contact pressure roller 11, before the strip-shaped blank 6 passes the depression 22 of the edge support wedge molding profile 21. In the region of the depression 22, the strip-shaped blank 6 has the edge support wedge made of permanently-elastic plastic or hot-melt adhesive applied in the convex curvature region, before the strip-shaped blank 6 is moved by the transport chain 4 out of the shaping device 1.

In an advantageous embodiment of the invention, the guide profiles 7, 7' are set running slightly conically to one another, so that the radius of curvature of the strip-shaped blank 6 is continuously reduced during the transport to the application unit 10 for the liquid plastic or the hot-melt adhesive. This is achieved in that either one or both guide profiles 7, 7' are inclined slightly to one another up to the application unit 10.

Depending on the composition and consistency of the strip-shaped blank 6, it can be necessary to heat the strip-shaped blank 6 by suitable devices (not shown here) either before it is inserted into the shaping device 1 or within a first section 12 of the shaping device 1 before the application unit 10.

In a refinement of the invention, the shaping device 1 has a second section 13 after the application unit 10, in which a cooling zone for the strip-shaped blank 6 can be provided.

In practice, it has proven to be advantageous to store the strip-shaped blanks 6 for some time in an angled mold after leaving the shaping unit 1, to dissipate existing tensions in the strip-shaped blank 6 and to permit the edge support wedge made of still hot and therefore deformable molten plastic or hot-melt adhesive to cool enough that the edge support wedge maintains its shape and the skirting strip is only still deformable by mechanical load.

The application unit 10, which is schematically shown in section in FIG. 2, for the heated, liquid plastic or hot-melt adhesive is composed of a reservoir chamber 14 for the storage of the starting material 15 of the plastic or hot-melt adhesive forming the edge support wedge, a pressurized transport device 16 for the starting material 15, a melting plate 17, a heating block 18 having through boreholes for the molten plastic to the application nozzles 19, and an edge support wedge molding profile 21.

The application nozzles 19 preferably open into a recess 22 of the edge support wedge molding profile 21, which is separately shown in FIG. 3. The cavity arising between the convex curvature of the strip-shaped blank 6 and the surface of the edge molding profile 21 due to the recess 22 in the edge support wedge-shaped profile 21 is shaped according to the desired shape and thickness of the edge support wedge and is completely filled up by the molten plastic or hot-melt adhesive due to the pressure of the transport device 16, whereby the molten plastic or hot-melt adhesive adheres to the convex curvature of the strip-shaped blank 6 and solidifies to form the permanently elastic edge support wedge.

Greatly varying types of coverings for plastic floors are known, which differ more or less from one another both in their material composition, and also in their material thickness and possibly provided additional coatings. Using the device according to the invention, the desired skirting strips can be produced having arbitrary leg length from strip-shaped blanks of all known plastic covering types, wherein, however, the possibly required preheating, the application temperature of the molten plastic or hot-melt adhesive, and the cycle time of the strip-shaped blank are different for every covering. In a further preferred embodiment of the invention, the device according to the invention is equipped with a control and regulating unit, which has a data input device and a data memory and in which all required data for each individual covering can be stored and can be retrieved for the control and regulation of the device.

By the control of the speed of the transport chain 4 and the control of the application temperature of the molten plastic or hot-melt adhesive, precisely the mass of molten plastic or hot-melt adhesive arrives in the recess 22 of the edge support wedge molding profile 21, which is necessary to generate an edge support wedge formed completely with respect to volume, without an uncontrolled escape of excess molten plastic or hot-melt adhesive occurring adjacent to the edge support wedge molding profile 21.

In a further variant of the invention, devices are provided for detecting and relaying operating parameters to a data processing unit.

The advantages of the device according to the invention are in particular that this device is capable of producing skirting strips prefinished at the factory substantially more rapidly and with reproducible quality, and with high precision in a manner less ergonomically stressful for the operating personnel.

What is claimed is:

1. A device for producing a skirting strip for a floor covering made of a floor covering material comprising plastic, PVC, rubber, linoleum, or a flooring material similar thereto that produces a moisture-tight wall transition, said device comprising:

a shaping unit that has an inlet configured to receive a machine-produced strip-shaped blank made of the floor covering material and a bending unit configured to apply a convex bending region in the strip-shaped blank along a longitudinal axis of said strip-shaped blank, and a melting and application unit, configured to apply a permanently elastic edge support wedge made of molten plastic or hot-melt adhesive to the convex bending region of the strip-shaped blank, wherein the melting and application unit has an edge support wedge molding profile that is connected, via a transport device conveying the strip-shaped blank, to the shaping unit, and that molds, calibrates, and simultaneously attaches to the convex bending region of the strip-shaped blank the edge support wedge made of molten plastic or hot-melt adhesive.

2. The device according to claim 1, wherein the shaping unit further comprises a horizontal transport table and a perpendicular component arranged perpendicularly to the transport table, and the transport device is an endlessly revolving, unidirectional transport device.

3. The device according to claim 2, wherein the unidirectional transport device comprises a conveyor chain.

4. The device according to claim 3, wherein the shaping unit has a plurality of contact pressure rollers that are operationally connected to the conveyor chain, a guide profile on the transport table adjacent to the conveyor chain, and a further guide profile on the perpendicular component.

5. The device according to claim 4, wherein the two guide profiles are L-shaped and configured to be set via a plurality of final control elements to predefined leg widths and a predefined radius of curvature of the skirting strip.

6. The device according to claim 5, wherein the guide profiles have exposed profile legs that encompass the longitudinal edges of the strip-shaped blank.

7. The device according to claim 1, wherein the melting and application unit is equipped with a reservoir chamber storing a starting material for the plastic or hot-melt adhesive, said starting material being dimensionally-stable and permanently-elastic at room temperature, a pressurized supply device for the starting material, a melting plate for melting the starting material, and a heating block having continuous boreholes supplying the molten plastic or hot-melt adhesive to one or more application nozzles.

8. The device according to claim 7, wherein the application nozzles are arranged in the wall of the edge support wedge molding profile.

9. The device according to claim 7, wherein the edge support wedge molding profile has boreholes that functions as the application nozzles.

10. The device according to claim 7, wherein the edge support wedge molding profile has a depression and wherein the application nozzles open into the depression.

11. The device according to claim 10, wherein the depression in the edge support wedge molding profile is implemented in accordance with a predefined shape and thickness of the edge support wedge to be produced.

12. The device according to claim 4, and further comprising an additional contact pressure roller that presses the strip-shaped blank against the edge support wedge molding profile.

13. The device according to claim 4, wherein one or both guide profiles are inclined in a direction of a contact line of the transport table with the perpendicular component up to the melting and application unit.

14. The device according to claim 1, and further comprising a heating device heating the strip-shaped blank before the inlet of the shaping unit and/or inside a first section of the shaping unit before the melting and application unit.

15. The device according to claim 1, and further comprising a cooling device cooling a strip-shaped section located after the shaping unit and/or inside a second section of the shaping unit after the melting and application unit.

16. The device according to claim 1, and further comprising a control and regulating unit that, depending on a type, composition, and thickness of the floor covering material, regulates preheating of the strip-shaped blank, an application temperature of the liquid plastic or hot-melt adhesive, and a cycle time of the strip-shape blank via a drive of a transport chain, and that comprises a data input and storage device, that stores and retrieves data for a production process of the skirting strip for the covering material.

17. The device according to claim 1, and further comprising a device detecting and relaying operating parameters to a data processing unit.

* * * * *